United States Patent [19]

Midkiff et al.

[11] Patent Number: 4,961,623
[45] Date of Patent: Oct. 9, 1990

[54] PRETERMINATED OPTICAL CABLE

[75] Inventors: John A. Midkiff, Charlotte; Cyril A. Yancey, Conover; Robert W. Pollock, Hickory, all of N.C.

[73] Assignee: Siecor Corporation, Hickory, N.C.

[21] Appl. No.: 402,762

[22] Filed: Sep. 5, 1989

[51] Int. Cl.⁵ ................................................ G02B 6/36
[52] U.S. Cl. ............................... 350/96.20; 350/96.23
[58] Field of Search ................ 350/96.20, 96.23, 96.21

[56] References Cited

U.S. PATENT DOCUMENTS

| | | | |
|---|---|---|---|
| 4,359,262 | 11/1982 | Dolan | 350/96.20 |
| 4,702,551 | 10/1987 | Coulombe | 350/96.21 X |
| 4,805,979 | 2/1989 | Bossard et al. | 350/96.21 X |

FOREIGN PATENT DOCUMENTS 2587126  3/1987  France ............................. 350/96.23

OTHER PUBLICATIONS

Request for Proposal for Fiber Optic Cable (Home) dated Jun. 13, 1989, by U. S. West Business Resources, Inc., Design consideration and Attachment 1.
Photographs of Raychem preterminated copper cable.

Primary Examiner—John D. Lee
Assistant Examiner—Phan T. Heartney
Attorney, Agent, or Firm—J. David Abernethy

[57] ABSTRACT

A fiber optic cable which is preterminated in the factory. A first fiber optic cable on a reel enters a splicing (or splitting) receptacle. Some optical fibers continue through the receptacle and exit the receptacle into a second fiber optic cable, while other optical fibers in the first fiber optic cable are spliced in the receptacle to a third set of optical fibers which exit the receptacle into a third fiber optic cable such as a stub cable. A cable repair sleeve is installed over the receptacle assembly to seal and protect the completed receptacle area. The cables and receptacle are then coiled on a reel for shipment to the customer site.

7 Claims, 2 Drawing Sheets

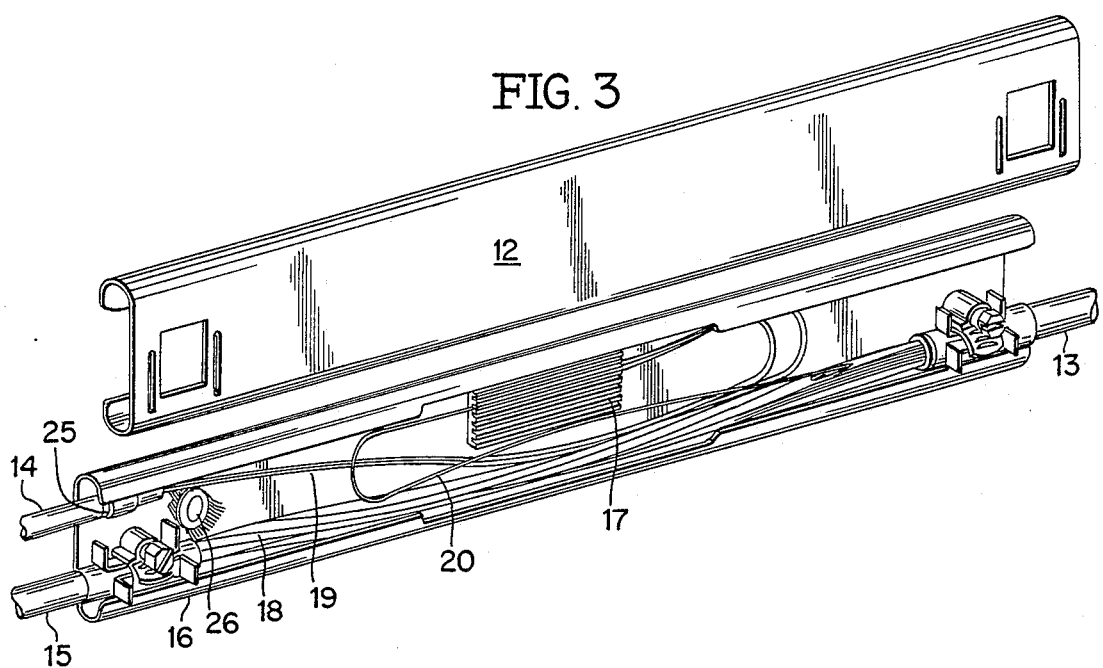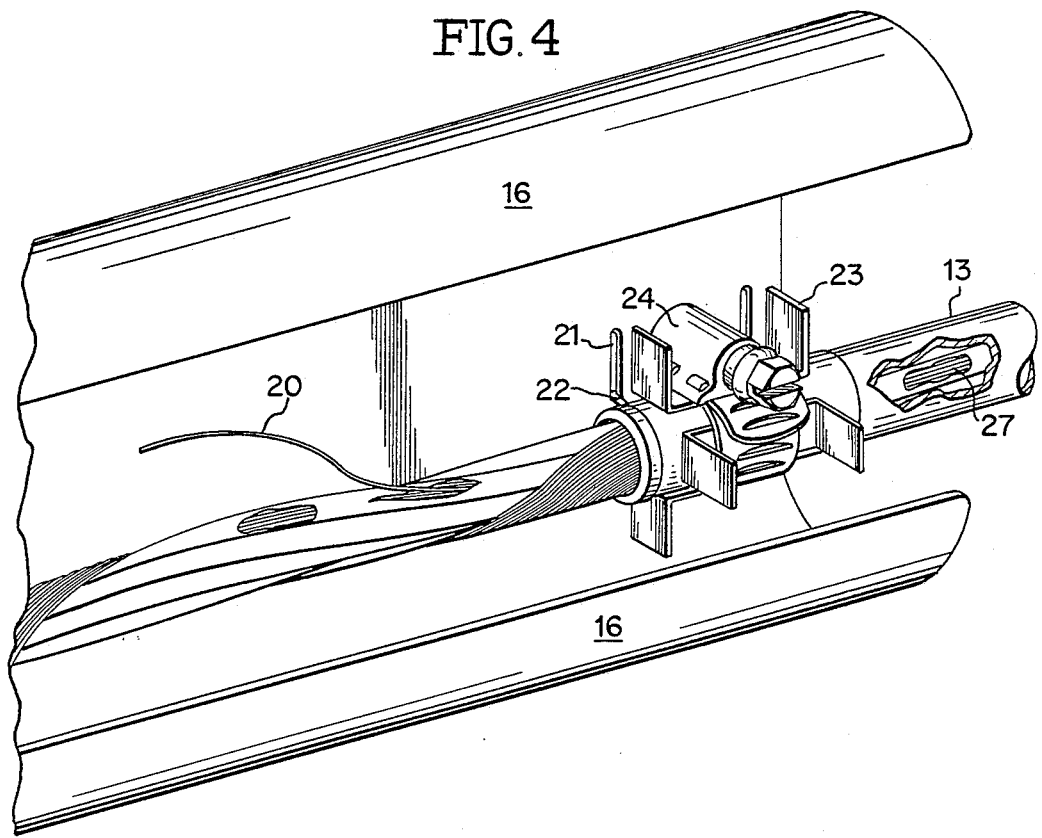

PRETERMINATED OPTICAL CABLE

BACKGROUND OF THE INVENTION

1. Field of the Invention

The field of the invention is fiber optic cables.

2. Background of the Invention

Typical fiber optic cables feature a sheath having one or more optical fibers. Fiber optic cables are coming into general use in the telephony network, particularly in trunk applications.

Industry experts predict that, in the 1990's and beyond, fiber optic cables will come into more general use in the subscriber loop, as cables having optical fibers extend from telephony central offices to individual homes and businesses. In this environment, the optical signals may need to run to a plurality of subscribers in a local neighborhood. Prior practice has been to install a standard optical cable, and then splice "drop cables" from the main fiber optic cable to individual subscribers. When this occurs, crafts-persons from the installing crew secure the cable at a given location, interrupt an existing optical fiber, and splice the optical fiber or fibers from the drop cable to the splice point of the optical fiber in the main optical fiber cable. When this occurs, the telephone company must pay the labor costs for the crew to perform this splice in the field. The reliability of the splice often depends upon the skills of the work crew involved. Further, when the optical fiber in the original cable is interrupted in this fashion, a remaining section of optical fiber is cut off from receiving further optical signals. This can result in sections of unused optical fiber in the original fiber optic cable. That is, in the terminated optical fiber, optical signals will come down the original fiber optic cable to the splice point, and then proceed from the splice point through the drop cable. However, the optical fiber in the original cable "downstream" from the splice point is no longer used. This is unfortunate, because optical fiber is by far the most expensive portion of a fiber optic cable.

BRIEF SUMMARY OF THE INVENTION

The fiber optic cable according to the present invention is "preterminated"; that is, a drop cable is placed on the cable in the factory, and the combination of original cable and drop cable is coiled on a reel for shipment.

The cable manufacturer will receive the customer's network requirement with the order. For instance, the cable may need to supply eleven subscribers who live on one street. To eliminate unused optical fiber, the first cable initial cable section will have a first tube having a predetermined length carrying eleven optical fibers to a branch point. At this point, only nine optical fibers are continued in the remaining section of the first cable, which second section will be the second tube. A separate drop cable, containing two optical fibers, is manufactured separately. A section of tubing is removed from the first cable corresponding to the length of the receptacle to be used. The drop cable having a third tube will then be attached to the receptacle and the two fibers in the drop cable in the third tube will be spliced to two of the optical fibers entering the receptacle from the first tube. The other nine optical fibers simply continue through the receptacle from the first tube to the second tube. This process is continued until all fibers have been dropped off.

Splicing is accomplished by mounting a splicing tray inside the receptacle. After the splicing is complete, and all cables have been properly secured to the receptacle, a moisture proof heat shrinkable enclosure is placed over the receptacle and around the three sections of tubing adjacent to the receptacle. After the moisture proof enclosure has been applied, the completed cable assembly is then wound on a reel for shipment to the customer.

When the customer receives the reel, the customer has received a desired fiber optic cable with a stub cable already attached. Splicing has already been accomplished in the factory and there is no need to reenter the moisture proof enclosure. The cable is simply unwound from the reel and placed into operation.

BRIEF DESCRIPTION OF THE DRAWINGS

Reference is now had to the several drawings, in which:

FIG. 3 is a view of the receptacle area with the receptacle cover removed; and,

FIG. 4 is a yet more detailed view of how a cable may be secured to the receptacle.

DETAILED DESCRIPTION OF THE PREFERRED EMBODIMENTS

Figure 1:
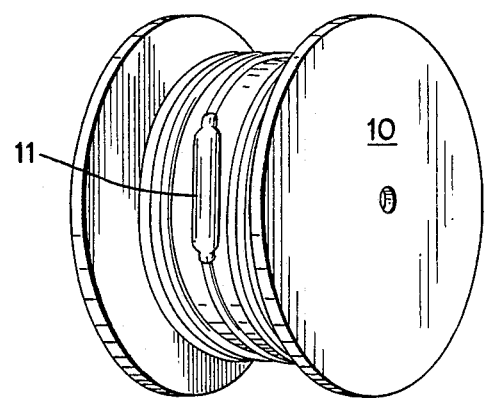
FIG. 1 is a perspective view of the assembly while wound on a reel.

FIG. 1 shows a preterminated cable assembly according to the invention stored for shipment on reel 10. Heat shrinkable moisture proof enclosure 11 has been placed around a metal receptacle in order to provide environmental protection to the receptacle area until a time when entry to the receptacle is required.

Figure 2:
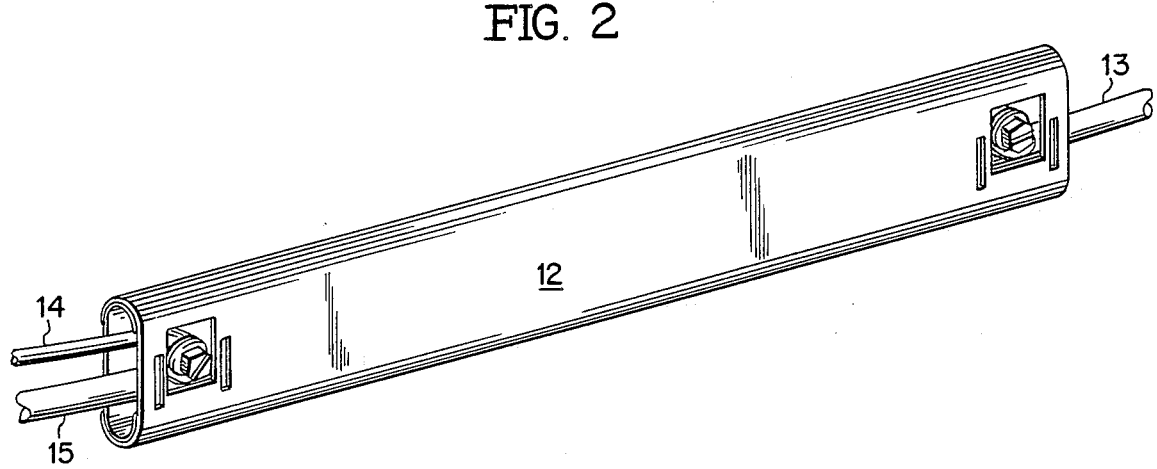
FIG. 2 is a detailed view of the receptacle area.

In FIG. 2, first tube 13, containing eleven optical fibers 27, is shown entering the receptacle first opening and second tube 15 and third tube 14 enter the receptacle at the receptacle second opening.

In FIG. 3, receptacle cover 12 has been removed. The apparatus securing first tube 13 and second tube 15 to the receptacle will be shown in greater detail in FIG. 4. Third tube 14 is secured to the receptacle by means of tie wrap 25 and screw 26, which clamps aramid strength members from third tube 14 to the receptacle base 16. Nine optical fibers in buffer tubes 18 proceed through the receptacle from first tube 13 to second tube 15. Two optical fibers 20 are separated and are routed into splice tray 17 secured to receptacle base 16. Then two optical fibers 20 are spliced in splice tray 17 to two optical fibers 19 entering the receptacle from third tube 14.

In FIG. 4, first tube 13 is secured to receptacle base 16 by sheath retention clip 23. Flange 22 is inserted through slot 21 in receptacle base 16 and then bent to secure clip 23 to receptacle base 16; clip 23 is also secured by another flange and slot in the same manner. Tube 13 is tightened to clip 23 by means of hose clamp 24. Tube 15 is secured to receptacle base 16 in the same manner.

The use of the receptacle in an environmentally secure location will also allow the use of splitters, which allow signals to be routed from one optical fiber into two or more optical fibers. Today, splitters are generally found in the equipment packages, not in the field.

It is anticipated that more than one cable will be dropped off at a receptacle, instead of only one being dropped off a described above for the sake of simplicity.

What is claimed is:

1. A preterminated optical cable, comprising:
   (a) a receptacle having opposing first and second openings;
   (b) a first tube entering the receptacle first opening and secured to the receptacle;
   (c) a second tube and a third tube, the second and third tubes entering the receptacle second opening and secured to the receptacle;
   (d) a first set of optical fibers which (i) are carried by the first and second tubes, and (ii) proceed through the receptacle between the first and second tubes;
   (e) a second set of optical fibers carried by the first tube and a third set of optical fibers carried by the third tube, the second and third set of optical fibers in optical communication with each other in the receptacle; and
   (f) a reel on which the receptacle, first tube, second tube, and third tube are placed for shipment.

2. A preterminated optical cable as described in claim 1, wherein the number of optical fibers in the second and third sets are equal.

3. A preterminated optical cable as described in claim 1, further comprising a splicing tray mounted in the receptacle in which the second and third sets of optical fibers are spliced.

4. A preterminated optical cable as described in claim 3, further comprising a moisture proof container around the receptacle and a portion of the first, second, and third tubes adjacent to the receptacle.

5. A preterminated optical cable as described in claim 1, wherein the number of optical fibers in the first tube is greater than the number of optical fibers in the second tube.

6. A preterminated optical cable as described in claim 5 wherein the number of optical fibers in the first tube is greater than the number of optical fibers in the third tube.

7. A preterminated optical cable as described in claim 4, further comprising an optical splitter in the receptacle.

* * * * *